March 2, 1965   L. F. WALDMAN, JR   3,171,475

APPARATUS FOR BLOOD HANDLING

Filed April 6, 1962

INVENTOR.
LEONARD F. WALDMAN JR.

BY

ATTORNEY

United States Patent Office 3,171,475
Patented Mar. 2, 1965

3,171,475
APPARATUS FOR BLOOD HANDLING
Leonard F. Waldman, Jr., Niles, Ill., assignor to Baxter Laboratories, Inc., Morton Grove, Ill., a corporation of Delaware
Filed Apr. 6, 1962, Ser. No. 185,600
2 Claims. (Cl. 165—67)

The present invention relates to a device for use in varying the body temperature of a living animal. More particularly, it relates to a novel device which makes it possible to extracorporeally vary the temperature of the blood of a living animal and thereby vary its body temperature.

The desirability of being able to vary, at will, the body temperature of a living animal is well recognized in the field of surgery because of the physiological changes which occur at elevated or reduced temperatures. The lowering of the body temperature of a limb, for example, may make possible the performance of a so-called "bloodless" operation. Lowering of the body temperature may also make it possible for the heart surgeon to immobilize and by-pass the heart through use of an artificial-heart lung machine, thereby making it possible to perform operations on the heart itself. Further, of course, the anaesthetic-like effect that accompanies the lowering of the body temperature is often desired as a goal in surgical procedures.

In the past, various attempts have been made to develop devices that make it possible to quickly and accurately vary the body temperature of a living animal. Although such obvious approaches as immersing the animal in hot or cold baths have been used, the most promising approach to the problem has been to connect a heat exchanger located exteriorly of the animal's body, into the circulatory system of the animal, circulate the blood through the heat exchanger to vary its temperature and then return the blood to the animal via its circulatory system. The extensive network of veins, arteries and smaller blood vessels of the animal's circulatory system makes it possible by circulating the warmed or cooled blood to quickly and effectively lower or raise the body temperature of the animal. Even the use of the extracorporeal heat exchangers, however, has not been completely satisfactory because of the serious disadvantages inherent in the heat exchangers employed. The heat exchangers employed in treating blood in the past have been difficult to sterilize, pyrogenic, non-expendable, difficult to clean, easily breakable, non-transparent, bulky, hemolysis inducing, air bubble entrapping, or simply inefficient. In many instances the devices have possessed combinations of at least two or more of these defects.

A novel disposable plastic flow passage for employment as a heat exchanger, of which I am the joint inventor, is disclosed in the copending application U.S. Serial No. 119,537, filed June 26, 1961, now Patent No. 3,140,716 granted July 14, 1964. This novel disposable hemorepellent heat exchanger flow passage is formed by heat sealing two thermoplastic sheets such as polyvinyl sheets in a face to face relationship to form an elongated serpentine passage for the flow of blood. In use, this plastic heat exchanging flow passage is generally suspended in or simply placed into an open temperature bath. The temperature bath utilized up until the discovery of the novel device of the present invention has comprised an open tub or vat partially filled with water. The temperature of this bath being controlled by either dumping ice or warm water into the bath. The size of this temperature bath, the difficulty of controlling the temperature and the inability of observing the flow of the blood and quickly identifying leaks are only some of the disadvantages which accompany the use of the conventionally employed temperature baths.

It is therefore an object of the present invention to disclose a novel temperature bath jacket or container which when employed with a disposable plastic flow passage provides a compact, efficient heat exchanger for use in the extracorporeal circulation of blood.

It is a further object to disclose a heat exchanger-temperature bath jacket combination which provides for the visual observation of the flow of blood during temperature exchange and allows for the ready detection of flow passage leak and the like.

This and still further objects, will be apparent as the specification proceeds.

Briefly stated, I have discovered a novel jacket or container that may be used in combination with a disposable hemorepellent sterile and nonpyrogenic plastic flow passage to provide a simple see-through unit which can be used with advantage in the extracorporeal circulation of blood. The novel heat exchanger jacket of the present invention comprises a transparent hollow body portion, preferably with a plurality of leak-proof means closing the ends of said body portion to form a leak-proof container, at least one of which means is removable to allow for the introduction and removal of a disposable plastic flow passage from said container, a plurality of inlet and outlet ports extending through at least one wall of said container, preferably a closing means to provide for the introduction and removal of fluid from said container, spacing means positioned within said container to maintain the plastic flow passage in a predetermined position, and if desired, hanger means for suspending said container.

The invention will be further illustrated and described in connection with the accompanying drawing in which.

Figure 1:
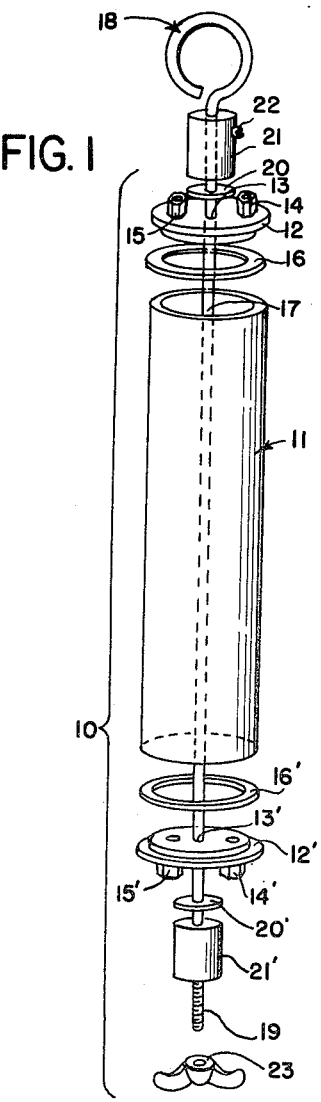
FIGURE 1 is an exploded front elevational view of the preferred embodiment showing the various components.

Referring more particularly to the drawing wherein like characters of reference designate like parts throughout the several views, the preferred form of the invention comprises the heat exchanger jacket generally referred to as 10 as seen in FIGURE 1. The heat exchanger jacket comprises a hollow, preferably transparent cylinder 11, which may be sealed by plugs 12 and $12^1$ at the upper and lower ends respectively to form a chamber. The plugs 12 and $12^1$ are each provided with a central aperture 13 and $13^1$ and a pair of swagelock type tubing fittings 14 and $14^1$, and 15 and $15^1$ respectively.

To insure a leak-proof connection between the cylinder 11 and the plugs 12 and $12^1$ there are provided gaskets 16 and $16^1$ which are of a compressible material such as neoprene, rubber or the like. Extending axially through the plugs 12 and $12^1$ and the hollow cylinder 11 is a compression rod 17 which is provided at one end with hanger means 18 and at the other end with a threaded section 19. The compression rod is further provided with overriding neoprene washers 20 and $20^1$ and collars 21, $21^1$. The collar 21 is adjustable vertically along the rod 17 and is provided with a set-screw 22 which enables it to be locked in position at a desired point along said rod. To lock the plug 12 in a leak-proof position with the cylinder 11 a thumb nut 23 is provided for threaded engagement with section 18 of the compression rod.

Figure 2:
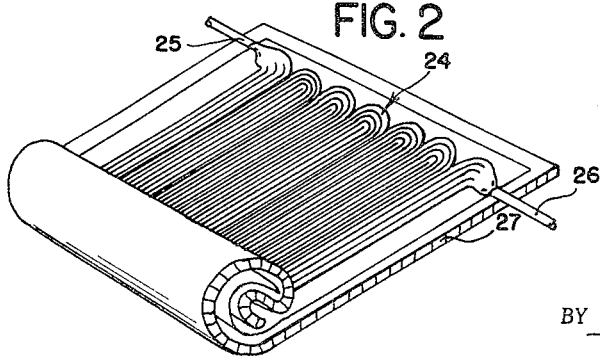
FIGURE 2 is a plan view of one form of disposable plastic flow passage and spacer means.

In FIGURE 2 there is seen the disposable plastic flow passage 24 with its inlet and outlet tubes 25 and 26 and the open-celled spacer means 27.

Figure 3:
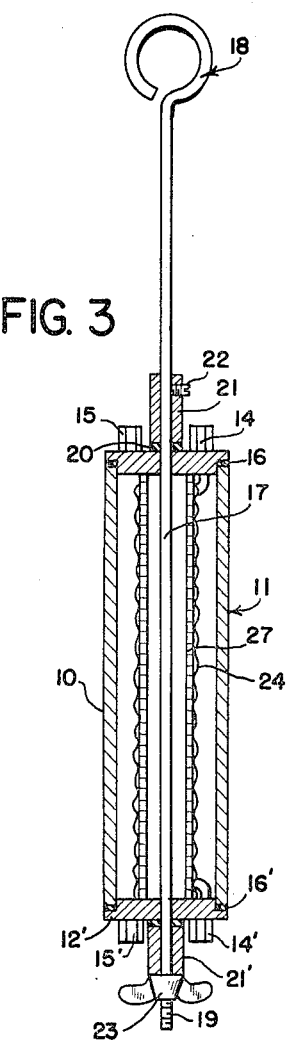
FIGURE 3 is a vertical sectional view through the novel heat exchanger jacket with the disposable plastic flow passage and spacer means in place.

To provide a unitary heat exchanging device the plastic flow passage 24 and spacer means 27 are rolled about the compression rod 17 to form a cylindrical form and inserted into the cylinder 11. The inlet and outlet tubes 25 and 26 of the plastic flow passage are then extended through and locked in a leakproof manner within the swage-lock type tubing fittings 14, 14¹. The various previously described components illustrated in FIGURE 1 are then assembled to form the complete unitary leakproof heat exchanger unit seen in FIGURE 3 in section. The device is held in unitary leak-proof form by the cooperation of the compression rod 17, the washers 20, 20¹, the collars 21, 21¹, the lock screw 22 and the threaded nut 23.

In operation, the unit is generally suspended by hanger means 18 from an intravenous stand (not shown) or similar type stand. The assembled heat exchanger unit is then connected by flexible tubing via swage-lock fittings 15, 15¹ to a source of cooling or warming media which can be pumped from and returned to a reservoir. The swage-lock fittings 14, 14¹ which communicate with the plastic flow passage inlet and outlet tubes are connected into an extracorporeal circulatory system such as an artificial heart-lung device (not shown). Generally the blood is introduced at the top of the heat exchanger and removed at the bottom. This reduces the likelihood that hemolysis of the blood may result from unneeded pumping of the blood upwardly through the continuous plastic flow passage.

Although plastic has never been considered a particularly good conductor, it has been found that by employing a single unit of the preferred construction of heat exchanger and a circulating ice water bath, the normal temperature of blood which is 37° C. can be lowered as much as 22° C. at flow rates up to 500 cc./minute. If higher flow rates are required, several of the devices can be utilized in a parallel bank to accommodate the greater flow rate.

The following table presents the results obtained with the preferred form of the heat exchanger using an ice water bath and differing flow rates.

| Flow Rate, ml./min. | Temp. of Blood Entering Heat Exchanger, °C. | Bath Temp., °C. | Final Temp. Blood, °C. | Drop in Temp. Blood, °C. |
|---|---|---|---|---|
| 100 | 39 | 1 | 3 | 36 |
| 200 | 39 | 1 | 6½ | 32½ |
| 300 | 39 | 1 | 10 | 29 |
| 500 | 39 | 1 | 17 | 22 |

This range of temperatures includes all the temperature variations indicated as desirable by almost all the various proponents of the use of hypo- and hyperthermia. For example, cardiac arrest occurs when the blood is less than 12° C. The preferred form of heat exchanger also performs more than adequately where is is desired to increase the temperature of the blood. However, increases in the temperature of the blood are rarely indicated and the blood can only be raised a few degrees above 39° C. before the protein coagulates.

The spacer means 27 to be used in the novel heat exchanger is preferably formed of foraminous material such as open-celled polyurethane, polyvinyl foam or the like. Generally a sheet of open-celled polyurethane foam 1 inch thick is preferred. However, if desired, almost any sheet-like flexible material, or any cylindrically shaped perforated spacer means may be employed. The rate of flow of the cooling or warming media for a constant capacity pump may be effectively varied by varying the size of the openings or open cells of the spacer means.

The plastic flow passage employed is preferably the heat sealed, disposable, hemorepellent, sterilizable plastic flow passage 24 illustrated in FIGURE 2 which is claimed and described in my forementioned joint patent application. However, if desired, a length of sterile and, of course, disposable relatively thin-walled plastic tubing may be employed, for example, 50 ft. of ¼" I.D. by .025 to .035" wall polyvinyl tubing. The tubing is simply coiled about the spacer means and each end of the tubing connected into the swage-lock tubing fitting 14 and 14¹.

The novel jacket of the present invention provides a simple compact heat exchanger for varying the temperature of body fluids. In addition it shows considerable promise as a dialysis bath jacket for use with a dialysis membrane as an artificial kidney. It provides a see-through feature by virtue of its transparent cylinder that permits the operator to quickly observe any leakage of blood into the dialysis, cooling or warming media. It eliminates costly cleaning procedures and the need for resterilization of the biological fluid passageways in that it renders possible the usage of a disposable, sterile, non-pyrogenic insert which may be mechanically and bacteriologically tested and supplied by a pharmaceutical house. In addition, it provides a self-contained hanger for suspension and more importantly, a geometric spacing feature for distributing the media flow past the dialysis or heat exchange surface.

From the foregoing description it will be readily apparent that all of the objects and advantages of the present invention have been accomplished. However, it will also be apparent that a great number of modifications and changes may be made without departing from the spirit and scope of the present invention. Therefore, it is to be understood that all the matter shown or described should be interpreted as illustrative and not in a limiting sense.

The embodiments of the present invention in which an exclusive property or privilege is claimed are as follows:

1. In an apparatus for use in changing the temperature of the body of a living animal by circulating the blood of said animal extracorporeally through a closed system comprising at least in part a heat exchanger and then returning the blood of changed temperature to the animal, the improved heat exchanger which comprises a transparent hollow cylinder open at both ends, a pair of closure means closing said open ends, each of said closure means being provided with an inlet port and an outlet port and a centrally located aperture, an elongated compression rod passing through the hollow cylinder and the aperture of each of said closure means, means associated with said compression rod for securing said closure means to the ends of said cylinder to form a unitary, leakproof container, hanger means for said container, and a disposable, sterile, hemorepellent plastic flow passage for blood and foraminous spacing means positioned within and partially filling said container and positioned about said compression rod, said plastic flow passage being provided with an inlet and an outlet which communicates with an inlet port and an outlet port respectively of said closure means whereby blood can be introduced into said plastic flow passage and removed via said inlet and outlet ports, respectively, and a heat exchanging fluid can be introduced into the interior of said container which is not occupied by said plastic flow passage and spacing means, and removed therefrom by the other of said inlet and outlet ports, respectively.

2. In an apparatus for use in changing the temperature of the body of a living animal by circulating the blood of said animal extracorporeally through a closed system, comprising at least in part, a heat exchanger and then returning the blood of changed temperature to the animal, the improved heat exchanger which comprises a transparent hollow cylinder open at both ends, removable closure means closing said open ends, each of said closure means being provided with an inlet port and an outlet port and a centrally located aperture, an elongated compression rod passing through the hollow cylinder and the aperture of each of said closure means, means associated with said compression rod for securing said closures to the ends of said cylinder to form a unitary, leakproof container, hanger means for said container, and a disposable, sterile, hemorepellent plastic flow passage for blood and spacing means positioned within and partially filling said container and positioned about said compression rod, said plastic flow passage being provided with an inlet and an outlet which communicates with an inlet port and an outlet port respectively of said closure means whereby blood can be introduced into said plastic flow passage and removed via said inlet and outlet ports, and a heat exchanging fluid can be introduced into the interior of said container which is not occupied by said plastic flow passage and removed therefrom by the other of said inlet and outlet ports, respectively.

References Cited by the Examiner

UNITED STATES PATENTS

| 1,563,608 | 12/25 | Wood | 165—141 |
| 2,157,744 | 5/39 | Welty | 165—141 |
| 2,608,968 | 9/52 | Moseley | 126—271 |
| 2,814,467 | 11/59 | Brinen | 165—67 |
| 3,078,847 | 2/63 | Wendell et al. | 129—214 |

CHARLES SUKALO, *Primary Examiner.*